(12) United States Patent
Stephenson et al.

(10) Patent No.: US 12,083,449 B2
(45) Date of Patent: Sep. 10, 2024

(54) STEAM CO-INJECTION FOR THE REDUCTION OF HEAT EXCHANGE AND FURNACE FOULING

(71) Applicant: PHILLIPS 66 COMPANY, Houston, TX (US)

(72) Inventors: Tyler J. Stephenson, Bartlesville, OK (US); Keith H. Lawson, Bartlesville, OK (US); Bryony J. Merrall, Grimsby (GB); Brody L. McDougal, Ponca City, OK (US); Howard L. Wilson, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 135 days.

(21) Appl. No.: 17/523,466

(22) Filed: Nov. 10, 2021

(65) Prior Publication Data

US 2022/0184529 A1 Jun. 16, 2022

Related U.S. Application Data

(60) Provisional application No. 63/124,336, filed on Dec. 11, 2020, provisional application No. 63/124,364, filed on Dec. 11, 2020.

(51) Int. Cl.
| | | |
|---|---|---|
| *B01D 17/04* | (2006.01) | |
| *B01D 17/02* | (2006.01) | |
| *B08B 9/032* | (2006.01) | |
| *C10G 9/16* | (2006.01) | |
| *C10G 75/00* | (2006.01) | |

(Continued)

(52) U.S. Cl.
CPC .......... *B01D 17/04* (2013.01); *B01D 17/0205* (2013.01); *B08B 9/0321* (2013.01); *C10G 9/16* (2013.01); *C10G 75/00* (2013.01); *F28G 9/00* (2013.01); *F28G 15/003* (2013.01);

(Continued)

(58) Field of Classification Search
CPC .. B01D 17/04; B01D 17/0205; B08B 9/0321; B08B 2209/032; C10G 9/16; C10G 75/00; C10G 2300/4075; C10G 2300/807; F28G 9/00; F28G 15/003
See application file for complete search history.

(56) References Cited

U.S. PATENT DOCUMENTS 4,150,716 A * 4/1979 Ozaki .................. C10G 9/002
585/539
5,257,296 A * 10/1993 Buford, III ............... F28G 9/00
376/310

(Continued)

FOREIGN PATENT DOCUMENTS

| CA | 2035421 | * | 1/1991 | |
| CA | 2592568 A1 | * | 12/2008 | ........... B08B 9/0321 |
| WO | WO-2022035873 A1 | * | 2/2022 | |

*Primary Examiner* — Sharidan Carrillo
(74) *Attorney, Agent, or Firm* — Phillips 66 Company

(57) ABSTRACT

A process for removing or reducing the accumulation of fouling deposits within furnaces and heat exchangers in industrial systems by introducing a periodic steam blast. The steam blast is directed into the process fluid from which fouling deposits precipitate onto the heat exchanger surfaces. The steam blast increases the flow rates, creates turbulence and increases the temperature within the heat exchanger to dislodge foulant in both soft and hardened states from internal surfaces upon which foulants have adhered and accumulated.

19 Claims, 5 Drawing Sheets

(51) Int. Cl.
    *F28G 9/00*           (2006.01)
    *F28G 15/00*        (2006.01)

(52) U.S. Cl.
    CPC ................... *B08B 2209/032* (2013.01); *C10G 2300/4075* (2013.01); *C10G 2300/807* (2013.01)

(56) References Cited

U.S. PATENT DOCUMENTS

| | | | |
|---|---|---|---|
| 10,357,809 B2* | 7/2019 | Montgomery | C11D 3/02 |
| 2005/0211274 A1* | 9/2005 | Jansen | B08B 9/00 |
| | | | 134/26 |
| 2006/0169305 A1* | 8/2006 | Jansen | C11D 3/2062 |
| | | | 134/37 |
| 2011/0209730 A1* | 9/2011 | Varrin, Jr. | F28G 9/00 |
| | | | 134/166 R |
| 2013/0152973 A1* | 6/2013 | Jones | F22B 37/54 |
| | | | 122/392 |

\* cited by examiner

STEAM CO-INJECTION FOR THE REDUCTION OF HEAT EXCHANGE AND FURNACE FOULING

CROSS-REFERENCE TO RELATED APPLICATIONS

This application is a non-provisional application which claims the benefit of and priority to U.S. Provisional Application Ser. No. 63/124,336 and U.S. Provisional Application Ser. No. 63/124,364, both of which were filed on Dec. 11, 2020, and entitled "Steam Co-Injection for the Reduction of Heat Exchange and Furnace Fouling" and are hereby incorporated by reference their entirety.

STATEMENT REGARDING FEDERALLY SPONSORED RESEARCH OR DEVELOPMENT

None.

FIELD OF THE INVENTION

This invention relates to removing and preventing the buildup of solids that form inside heat exchanger pipes and other conduits in a refinery.

BACKGROUND OF THE INVENTION

Fouling is a broad term that describes the accumulation of unwanted material on solid surfaces that impairs, impedes or interferes with the function of systems or equipment. In refineries, much effort is expended to control fouling.

Fouling in heat exchangers and furnaces is well known in oil refining and much effort has gone toward understanding it and trying to control or abate it. Crude oil includes an array of components that vary from one crude source to another and some of those components are vulnerable to the inducing of fouling. Fouling precursors include viscous polymeric material and mesophase along with other crude oil components. These precursors create dense and a well-adhered foulant layer on the surfaces of pipes and conduits which can also trap solid particles such as salt crystals or corrosion products. Heating causes various fouling precursors to form or precipitate from crude oil within the heating systems and, in order to refine crude oil, the crude oil must be heated. Typically, crude oil is heated through a succession of heat exchangers in preparation for distillation and other refining processes. In time, the congealed and solidified foulants harden and become strongly adhered to heat exchange surfaces in baked-on-like carbon deposits that are very difficult to remove by solvents, scrubbing and scraping.

Efforts to control fouling include crude oil blending to keep high fouling crudes from being refined without dilution with lower fouling content crudes and adding fouling retardants. Ultimately, fouling occurs, and the next step is shutting down equipment to remove the foulant or replacing parts within the process equipment to renew the performance of the furnace or heat exchanger. Shutting down equipment impairs financial performance of a refinery as does operating with impaired equipment and eventually forcing a decision to shut down must be made.

It has been reported that fouling may (but not always) be minimized by maintaining a relatively high (for example, 2 m/s) and uniform fluid velocity throughout the fouling prone components, where stagnant regions need to be eliminated. Components are normally overdesigned to accommodate the fouling anticipated between cleanings. However, a significant overdesign can be a design error because it may lead to increased fouling due to reduced velocities. Periodic on-line pressure pulses and/or backflow have been suggested if the capability is carefully incorporated at the design time. Low-fouling surfaces (for example, providing a very smooth surface perhaps implanted with ions, or of low surface energy material like Teflon®) may be an option for some applications. Modern components are typically required to be designed for ease of inspection of internals and periodic cleaning. On-line fouling monitoring systems are designed for some application so that offline blowing or cleaning can be applied before an unexpected shutdown is necessary or the system is damaged or compromised.

The industry has long needed an effective foulant control scheme that allows continued refinery operation but reduces or better yet, removes accumulated fouling deposits from within areas prone for such problems.

BRIEF SUMMARY OF THE DISCLOSURE

The present embodiment relates to a process for operating an industrial device for heating a process fluid stream where the process fluid includes components that are prone to causing fouling or forming deposits on one or more surfaces within the industrial device. The process includes directing the process fluid stream into the industrial device at a desired flow rate and heating the process fluid stream within the industrial device as the process fluid stream moves along the one or more surfaces within the industrial device where foulants may form and deposit or adhere to the one or more surfaces. Periodically steam is injected into the industrial device in the tube-side chamber at a rate in excess of the desired flow rate for the process fluid stream and in sufficient quantity to create a higher flow rate and increased turbulence within the industrial device thereby dislodging foulant from one or more surfaces. The process fluid stream is then directed out of the industrial device with the dislodged foulant carried with the process fluid stream.

BRIEF DESCRIPTION OF THE DRAWINGS

A more complete understanding of the present invention and benefits thereof may be acquired by referring to the following descriptions taken in conjunction with the accompanying drawings in which:

FIG. 3 depicts an enlarged photo (1) of the inside of the test rod at position 1 showing foulant and bare metal;

FIG. 3 depicts an enlarged photo (2) of the inside of the test rod at position 2 showing additional foulant;

FIG. 3 depicts an enlarged photo (3) of the inside of the test rod at position 3 showing further foulant on the inside of the test rod;

FIG. 3 depicts an enlarged photo (4) of the inside of the test rod at position 4 showing the scoured inside of the test rod;

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
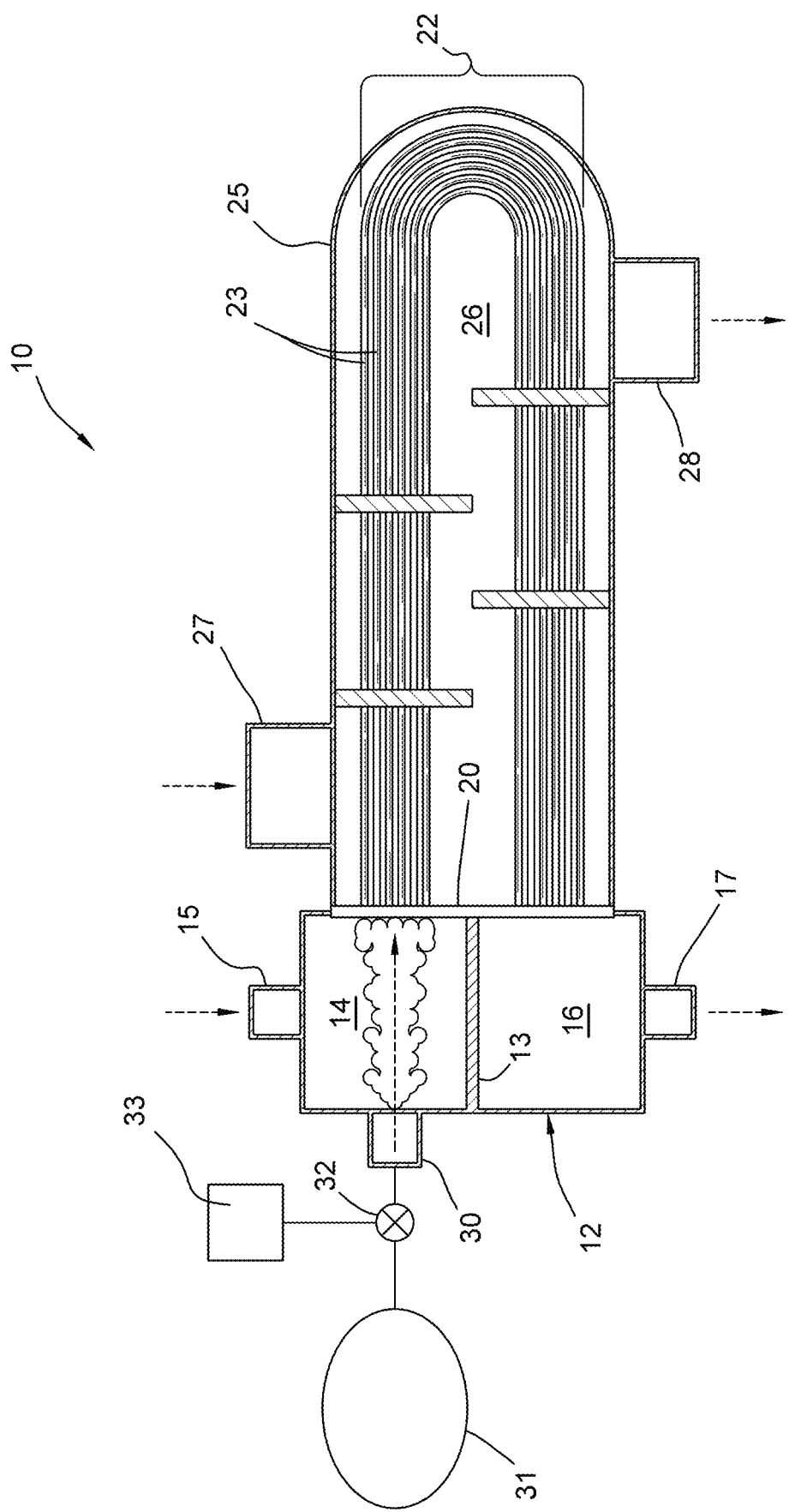
FIG. 1 is a schematic elevation view of a conventional shell and tube heat exchanger modified to perform the process of the present invention.

As shown in FIG. 1, a shell and tube heat exchanger 10 which includes a header 12 with a tube sheet 20. The header 12 is divided into two plenums by a divider 13 where an inlet plenum 14 is arranged in the upper portion of the header 12 and an outlet plenum 16 is in the lower portion of the header 12. A tube bundle 22 is shown where each of the plurality of tubes 23 are arranged to have two long straight generally horizontal runs with an upper run extending away from the inlet plenum 14 at the tube sheet 20 turning a tight, but rounded or arcuate 180 degree turn carrying back through a lower run to the lower outlet plenum 16. The tube sheet 20 includes a number of individual openings therein where each of the tubes 23 are affixed, typically by welding, such that fluid is carried inside the tubes from the inlet plenum 14 along the generally horizontal runs back to the outlet plenum 16. As will be explained below, the fluid inside the tubes 23 will be heated. For clarity, the tubes may be described as being in fluid communication with the inlet and outlet plenums 14 and 16 and the internal volume inside the tubes 23 may be described as the tube-side chamber of the heat exchanger 10. In addition, the inlet and outlet plenums 14 and 16 are also sealed from one another inside the header 12 so any fluid entering the outlet plenum 16 is arranged, in operation, to come through one of the tubes 23 in the tube bundle 22 and thereby not directly from the inlet chamber 14 such that fluid would bypass the tube bundle 22.

The heat exchanger 10 further includes a shell 25 that attaches to the header 12 near the tube sheet 20, typically by bolting, to close and cover the outside of the tube bundle 22 to define a shell-side chamber 26 under the shell 25 and around the outside of the tubes 23. The shell 25 is shown with a generally cylindrical shape with a bulbous, generally hemispherical end. One advantage of this generally cantilevered arrangement where everything is basically fixed at the left end (as seen in the drawing figure) and unrestricted at the other end is that the tubes 23 and shell 25 are generally free to expand and contract as the temperature of the heat exchanger 10 increases and decreases in temperature.

The tubes 23 may include supporting brackets to keep them spaced from one another and allow heat exchanging fluid to flow between all of the tubes and thereby surround the outside surface of all of the tubes 23 rather than permit any tubes to sag together and reduce the contact area on the outside surface of all of the tubes 23 for heat to cross from fluid in the shell side chamber to the fluid within the tube-side chamber.

A process fluid inlet 15 is attached to the header 12 to deliver a process fluid into the inlet plenum 14 from a pipe or conduit (not shown). A process fluid outlet 17 is similarly attached to the header 12 and arranged to receive the process fluid from the outlet plenum 16 and deliver it on to another pipe, conduit or system. The supply of the process fluid is well known and plumbing in the fluid supply and take away is not part of the invention. However, typically the heat exchanger 12 is operated to keep the tube-side chamber in a fluid full arrangement without air or gas pockets. In the case of a refinery, the process fluid is typically a crude oil or a petroleum intermediate product that is to be heated for some refining process.

The shell 25 includes a shell-side inlet 27 and a shell-side outlet 28 to circulate heat exchange fluid in and out of the shell-side chamber 26. To heat the process fluid, a second hotter fluid is brought into contact with the outside of the tubes 23 by delivering the hot, second fluid to the shell-side inlet 27 where the hot, second fluid fills the shell-side chamber 26 under the shell 25 providing its heat to the process fluid by contact with the exterior surfaces of the tubes 23. The second fluid may be steam or another fluid including hot liquids such as a petroleum stream that has been previously heated in a prior process system. The second fluid flows through the shell-side chamber 26 to the shell-side outlet outlet 28 attached to the shell 25 where it is carried away in a conduit. Like the tube-side chamber, the shell-side chamber 26 is typically operated to be fluid full.

Turning now to the modifications to the shell and tube heat exchanger 10, for the purposes of the present invention, the inlet plenum 14 additionally includes a steam inlet 30 to receive steam into the inlet plenum 14. Steam is supplied by a steam source 31 and the delivery is controlled by steam valve 32 in the steam line from steam source 31 to steam inlet 30. The steam valve 32 may be opened and closed by an operator or may be operated by a control device 33 that may include a timer for periodically opening the steam valve 32 at a set time and for a predetermined time. The control device may also include logic to respond to temperature as measured in the inlet plenum 14 and outlet plenum 16-s to use the temperature difference to lead to a steam blast treatment when a threshold temperature difference is detected. In the present invention, steam is periodically injected or blasted into the inlet plenum with force and in a manner and volume to dislodge foulants in the heat exchanger 10 and most particularly adhering in the tube-side chamber. The steam enters with force and in such a volume as to carry through the tubes 23 all the way to or close to the outlet plenum 16 and possibly through to the process fluid outlet 17. Prior to the steam being injected, the fluid flow through the tube-side chamber is stable although eddies and other non-linear flow characteristics are likely present. But upon the commencement of steam injection, much turbulence is introduced. Moreover, the temperature of the tube-side fluid increases which may slightly alter the dimension of the tubes by thermal expansion. All three of these phenomena may be at play removing foulant and foulant precursors.

Fouling on heat exchanger surfaces reduces heat transfer efficiency, decreases heat flux, induces corrosion under deposits, increases the use of cooling water and increases metal skin tube temperature which promotes degradation of the metallurgy, or fixes an upper temperature limit to the process, beyond which a shutdown of the equipment is required for cleaning. As fouling deposits accumulate, piping or flow channels form which reduces flow, increases pressure drop, increases upstream pressure, increases energy expenditure, may cause flow oscillations, slugging in two-phase flow, cavitation, may increase flow velocity elsewhere, may induce vibrations, may cause flow blockage, and sets an upper hydraulic limit on the process, beyond which a shutdown of the equipment is required for cleaning.

For the present invention, timing and duration of the periodic steam injection may include several considerations including the transitory reduction of throughput of the process fluid. The steam may be co-injected with the process fluid however the flowrate of the fluid may have to be reduced to accommodate the steam volume. There will be an accompanying economic impact to the transitory reduction of throughput. An instantaneous increase in pressure will also accompany the steam pulse, and thus the hydraulic limit of the system will need to be considered. Since the pulse will be injected as steam, there will not be an instantaneous volume expansion that would accompany a water pulse subject to rapid evaporation, however the steam will need to be injected above the system pressure to ensure it is directed through the appropriate flow path.

The steam pulsing program would ideally be conducted with daily or weekly frequency depending on the severity of the fouling. Starting with a freshly cleaned heat exchanger, the steam pulsing is expected to have greater utility against soft deposits, and thus the pulses should be used as frequently and as early in the run as is practical. Thermal aging of foulant produces a harder deposit that can have a harder bond to the underlying metal substrate making overall fouling management more effective when deposits are removed before they are allowed to substantially age. An effective steam pulse would displace up to 2 volumes of process liquid from the heat exchanger and last for approximately 1 minute. This short, sharp pulse of steam would minimize the amount of water that would dissolve into the process fluid, thereby maximizing its effectiveness at removing foulant.

In general, the targeted conditions for implementing the invention is to use superheated steam at about 500° F. and at about 100 psig which would have a specific volume of about 4.85 ft$^3$/lb. In a heat exchanger having 500 one-inch diameter tubes where each tube has an effective length of about 50 feet, the internal volume of the tube bundle would be 136.3 ft$^3$. In the steam blast condition, two volumes of the heat exchanger tube bundle would be displaced in one minute at a mass flow rate of approximately 3,400 lbs/hr of superheated steam. In normal operating conditions, about 450-1,250 lbs/hr per tube bundle pass are typical flowrates of velocity steam in a coker furnace.

EXAMPLES

Fouling tests were done with crude oil both with and without 10 vol % water being added. The fouling tests were completed in a thermal fouling tester, which consists of a flow loop where oil is directed over a hot metal surface that is held at a constant elevated temperature (450° C.) above the liquid temperature (50° C.). As foulant formed on the surface, heat transfer was impeded, and the outlet temperature of the oil decreased. The fouling thermal resistance was evaluated during the experiment as the inverse of the overall heat transfer coefficient which can be calculated from experimental parameters.

In one arrangement, a volume of crude oil was delivered into a heat exchanger with 10 percent by weight water added. The water was rapidly vaporized into steam within the heat exchanger. After the test volume of crude oil with water had fully passed through the heat exchange, the heat duty of the hot preheat train increased suggesting that the steam in the system had removed some foulant or prevented its deposition and improved heat transfer.

Figure 2:
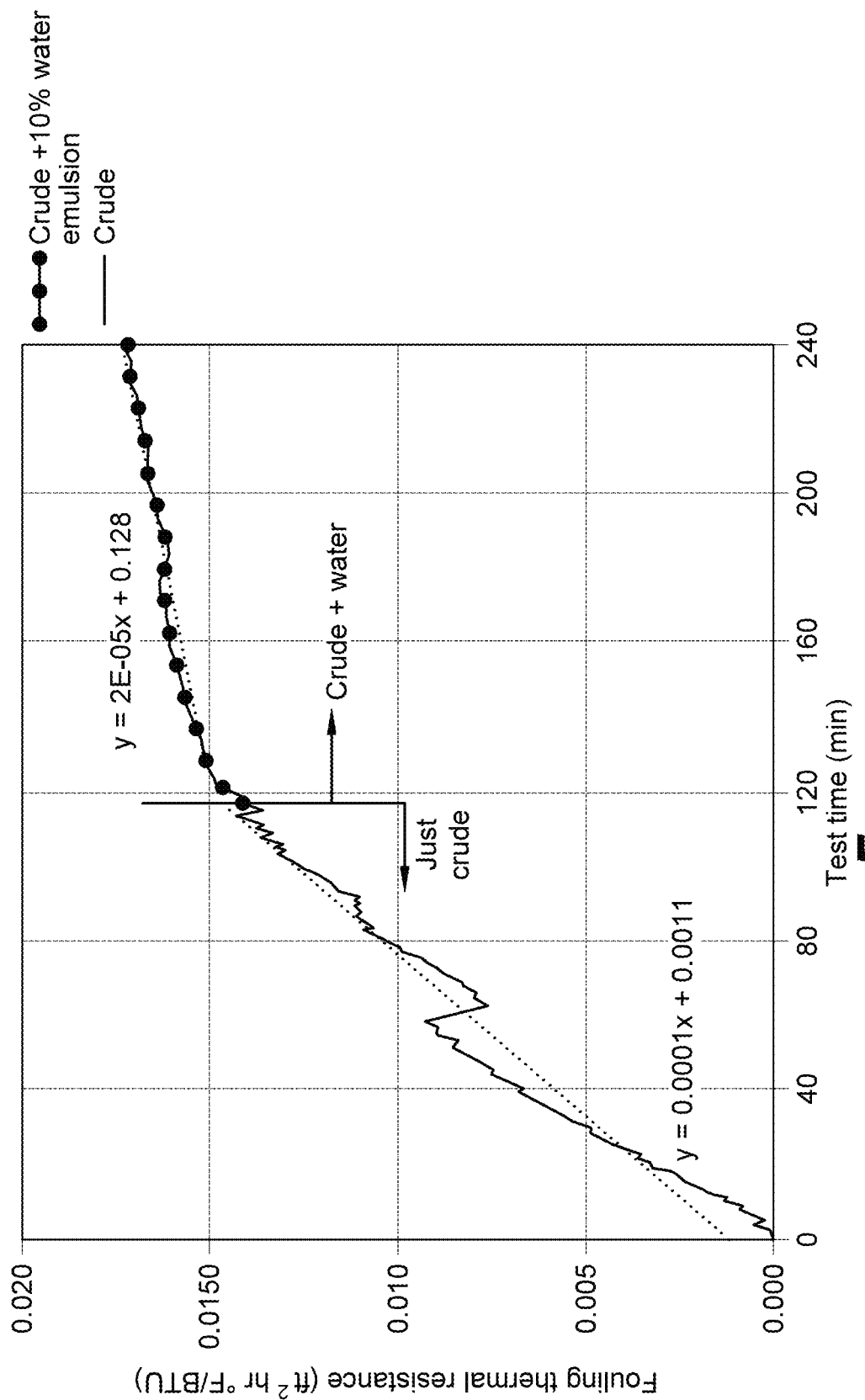
FIG. 2 is chart showing thermal resistance caused by fouling over time.

FIG. 2 shows the results of the laboratory fouling tests with steam. In the graph thermal resistance caused by the foulant is plotted against test time. The initial test with neat crude had a rapid fouling rate which increased the thermal resistance over time as indicated by the steep slope of the first portion of the curve. Once the neat crude test ended, the system was recharged with the crude oil that had been emulsified with 10 vol % water. In an effort to see if foulant could be removed by the vaporization of water during the test, the same test rod was used for all tests, and was therefore already fouled at the onset of the second test, which contained the water phase.

A natural slugging effect occurred in the flow system, which meant water was introduced intermittently and generated steam pulses that lasted approximately 3-4 minutes each and occurred approximately every 15 minutes during the 2-hour test. The fouling curve for the second test in FIG. 2 shows that the fouling rate was reduced by a factor of 5 when steam was in the system. Vaporization of the water was confirmed visually through the site glass in the flow system.

Figure 3:
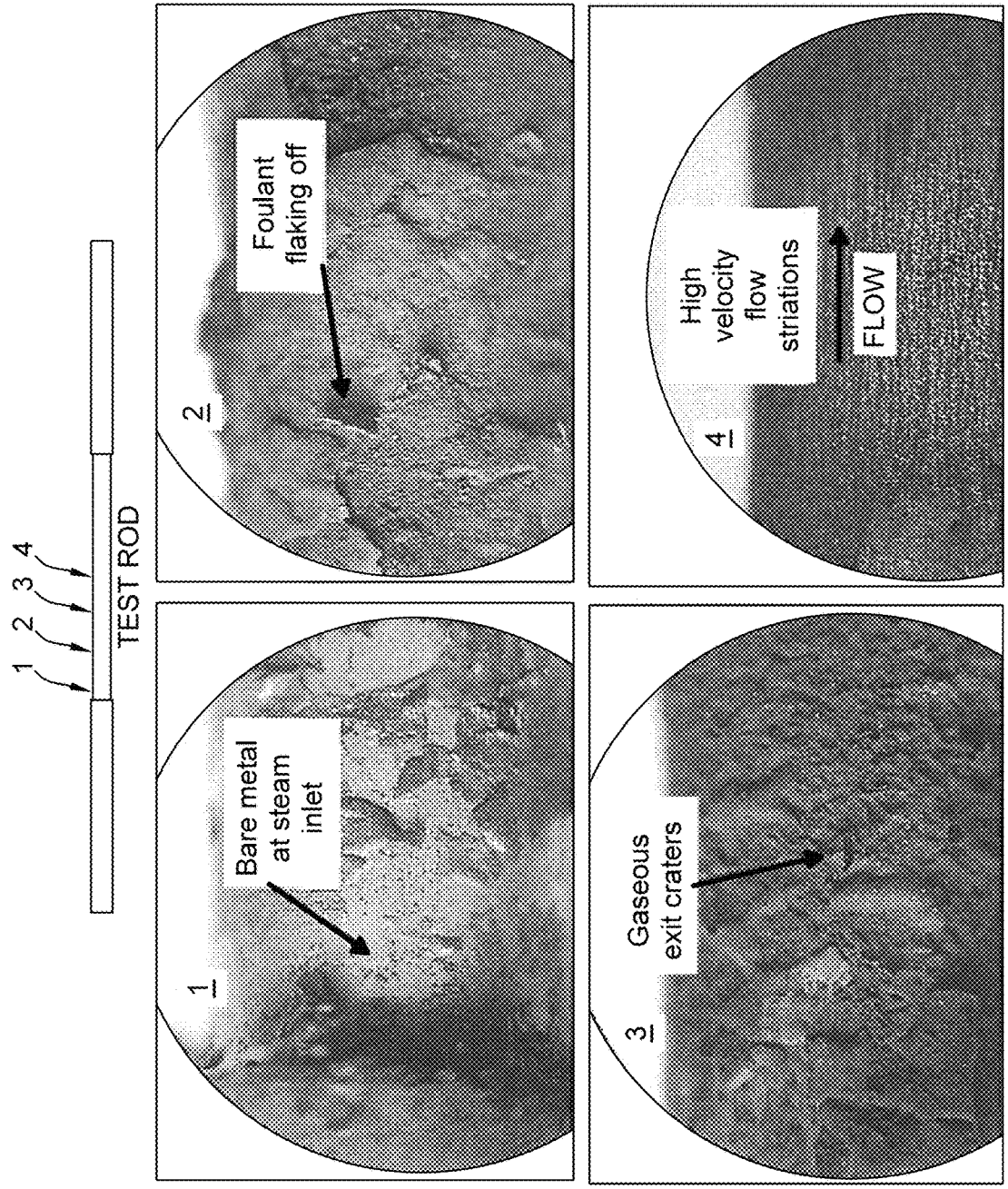
FIG. 3 depicts a diagram of the test rod used in experimentation.

FIG. 3 shows optical microscopy images of the fouled rod after the 2 fouling tests. Evidence of foulant removal along the length of the test rod is evident. The arrows in FIG. 3 highlight the foulant and the striations shown in FIG. 3 (Photo 4) were likely caused in the foulant by the turbulent two-phase flow of the crude oil and steam. The locations of each of the images along the length of the 3-inch test section of the rod are shown in FIG. 3. The flow striations in FIG. 3 (Photo 4) are especially indicative of the power of high velocity steam pulses within a tube to remove foulant from a fouled surface simply through the shear force of turbulence. The turbulence of steam introduced into the tubes 23 in the gas phase are powerful for removing foulant and fouling precursors.

Figure 4:
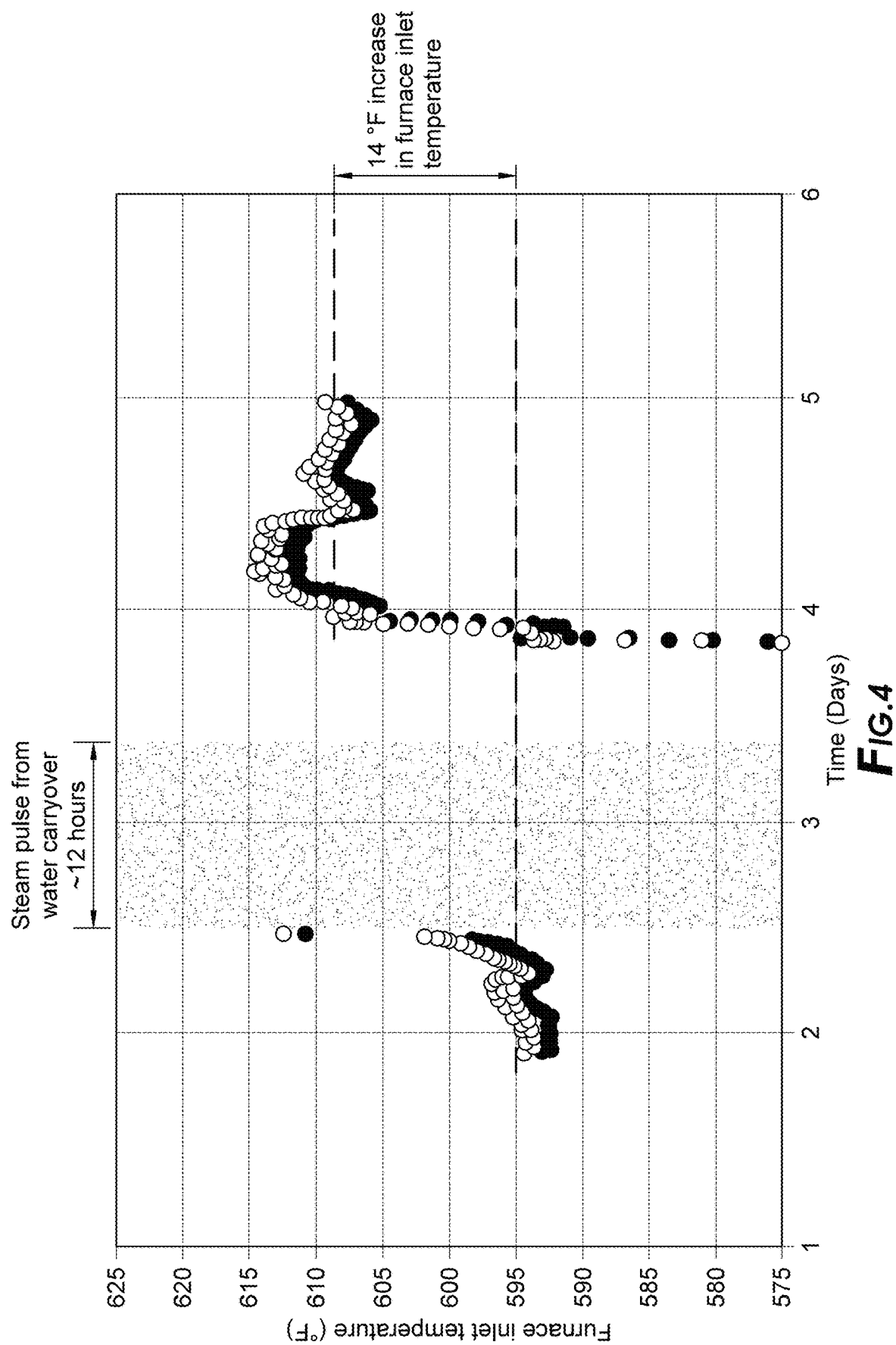
FIG. 4 is a chart showing furnace inlet temperature of crude oil in a refinery after being subjected to twelve hours of water carryover that formed a steam treatment within the heat exchanger tubes and showed improved heat transfer once the water carryover was suspended.

FIG. 4 shows results from a water carryover event in a refinery where water was carried into a heat exchanger in an emulsion state with crude oil. The graph in FIG. 4 shows the crude furnace inlet temperature plotted against time. Prior to the water carryover, the furnace inlet temperature was approximately 595° F. Water carryover occurred for approximately 12 hours, and after this, the furnace inlet temperature increased by 14. This increase indicates a recovery in heat duty of 10 MM BTU/hr for the hot preheat train.

Figure 5:
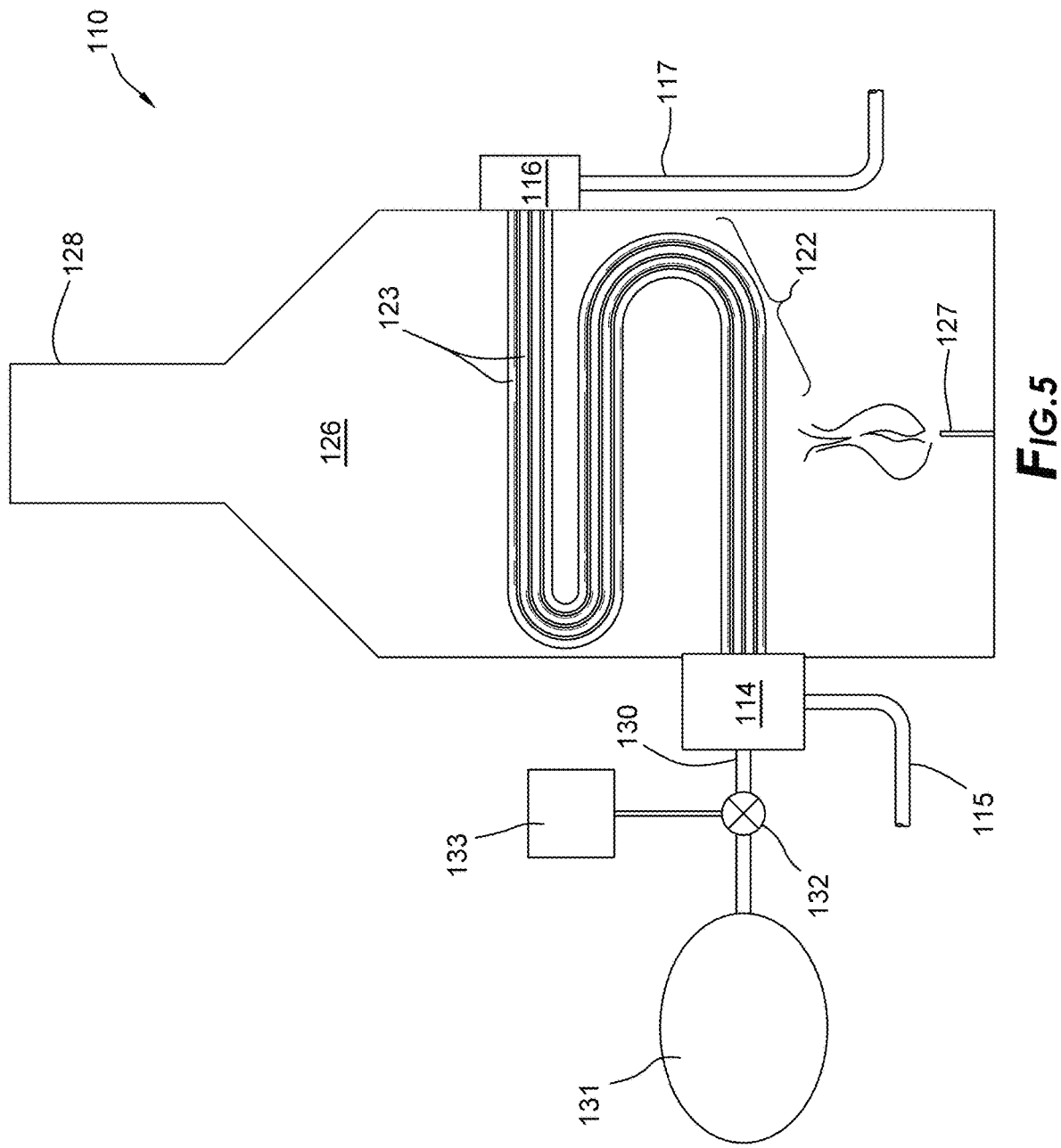
FIG. 5 shows an alternative heat exchanger embodiment where a furnace is heating the process fluid or, more particularly, heating the crude oil.

Turning to FIG. 5, another type of heat exchanger used to heat crude oil is a furnace 110 such as schematically shown. The Figure includes a housing 128 with a flame or heat source 127 heating up the inside 126 of the furnace 110. Passing through the inside 126 is a tube bundle 122 comprising a number of tubes 123. Crude oil is directed through the tube bundle from inlet plenum 114 as the crude is delivered from conduit 115 and taken out at plenum 116 and delivered away through conduit 117. Periodically, a steam blast is delivered into the inlet plenum and carried through the tube bundle 122 via steam inlet 130 from steam source 131. Steam is typically a standard utility in a refinery as it is used and created in multiple systems. The delivery of the steam is controlled by valve 132 that is under the management of the control system 133. This is basically a similar system to that shown in FIG. 1 with similar elements provided with similar numbering, but with "100" added to the numbers. And the inside 126 of the furnace 110 is analogous to the shell side chamber 26 of the heat exchanger in FIG. 1.

Ultimately, the steam pulses are preferred to be short and sharp and around 100 to 500 psig where the upper number is considered relative to the robustness of the tubes and heat exchange structure. The steam should be at least 50 psi above the pressure of the process fluid and last from about 1 to 30 seconds although a broader blast may be imposed. In crude oil, adding water, especially water that may form an emulsion is strongly un-preferred as water and steam tend to cause problems elsewhere downstream of the heat exchangers and furnaces. So, the addition of steam is done as needed to control fouling, but at least somewhat sparingly as the steam or water is preferably knocked out downstream, but the volume of water knockout systems is typically not great. It is contemplated that steam may be used as both the heating fluid and for foulant removing.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for operating an industrial device for heating a process fluid where the process fluid includes components that are prone to causing fouling or forming deposits on one or more surfaces within the industrial device, comprising:
   a) directing the process fluid into the industrial device at a desired flow rate,
      wherein the industrial device comprises a housing and a plurality of tubes that passes through the housing,
      wherein the plurality of tubes comprises an inlet plenum that comprises a first inlet that receives the process fluid and a second inlet that receives a source of steam,
      wherein an internal volume inside the plurality of tubes comprises a tube side chamber that conveys the process fluid from the inlet plenum through the tube side chamber,
      wherein a space between an outside of the plurality of tubes and the housing defines a shell-side chamber,
      wherein the shell side chamber and the tube side chamber are sealed from each other, and the shell side chamber receives a heating fluid;
   b) heating the process fluid within the industrial device to produce a heated process fluid by conducting heat from the heating fluid in the shell side chamber to the process fluid in the tube side chamber as the process fluid stream moves along the one or more surfaces within the industrial device where foulants may form and deposit or adhere to the one or more surfaces;
   c) periodically injecting steam into the inlet of plenum via the second inlet the industrial device at a rate in excess of the desired flow rate for the process fluid and in sufficient quantity to create a higher flow rate and an increase in turbulent two-phase flow of the steam and the process fluid within the tube side chamber to dislodge at least one of a foulant and a fouling precursor from one or more surfaces of the tube side chamber; and
   d) directing the heated process fluid out of the tube side chamber, wherein the heated process fluid contains at least one of the foulant, fouling precursor, or both.

2. The process according to claim 1, wherein the periodically injecting steam is performed for a duration in a range from two seconds to sixty seconds at each periodic time for injecting steam.

3. The process according to claim 1, wherein the process further comprises injecting steam at a frequency of no more than three times per week.

4. The process according to claim 1, wherein the process further comprises injecting steam at least once every 15 days.

5. The process according to claim 1, wherein the process further comprises injecting steam at a pressure that is in a range from 100 psig to 750 psig.

6. The process according to claim 1, wherein the process further includes the separating condensed steam as water from the process fluid downstream of the industrial device.

7. The process according to claim 1, wherein the process fluid is crude oil and the industrial device is for heating crude oil in a refinery.

8. The process according to claim 1, wherein the turbulent two-phase flow of the steam and the process fluid comprises slug flow to dislodge foulants adhering in the tube side chamber.

9. The process according to claim 1, wherein the process further comprises injecting steam for at least 5 seconds and up to four minutes at each periodic time for injecting steam.

10. The process according to claim 1, wherein the process further comprises injecting steam for at least 10 seconds and up to two minutes at each periodic time for injecting steam.

11. The process of claim 1, wherein the heated process fluid exits the tube side chamber by passing through an outlet plenum and the periodically injecting is performed when a threshold temperature difference is detected between the inlet plenum and the outlet plenum.

12. The process according to claim 7, wherein the industrial device is a furnace comprising a heat source located inside the furnace.

13. The process according to claim 7, wherein the industrial device is a shell and tube heat exchanger and the heating fluid is steam.

14. The process according to claim 10, wherein the process further comprises injecting steam for no more than 90 seconds.

15. The process according to claim 10, wherein the process further comprises injecting steam for no more than 75 seconds.

16. The process according to claim 10, wherein the process further comprises injecting steam for no more than 60 seconds.

17. The process according to claim 10, wherein the process further comprises injecting steam for at least 20 seconds.

18. The process according to claim 10, wherein the process further comprises injecting steam for at least 30 seconds.

19. The process according to claim 10, wherein the process further comprises injecting steam for at least 45 seconds.

* * * * *